United States Patent
Rennillo et al.

(10) Patent No.: US 7,376,561 B2
(45) Date of Patent: May 20, 2008

(54) REAL-TIME TRANSCRIPTION SYSTEM

(76) Inventors: Louis Ralph Rennillo, 50 Lyman Cir., Shaker Heights, OH (US) 44122; Irene Alexandra Holyk Rennillo, 50 Lyman Cir., Shaker Heights, OH (US) 44122; Randy Zinn, 2750 Clark Pkwy., Westlake, OH (US) 44145

(*) Notice: Subject to any disclaimer, the term of this patent is extended or adjusted under 35 U.S.C. 154(b) by 724 days.

(21) Appl. No.: 10/785,763

(22) Filed: Feb. 23, 2004

(65) Prior Publication Data
US 2005/0187766 A1 Aug. 25, 2005

(51) Int. Cl.
*G10L 15/00* (2006.01)
(52) U.S. Cl. .................. 704/235; 704/270; 709/219
(58) Field of Classification Search ............ 704/235, 704/260, 270; 709/219
See application file for complete search history.

(56) References Cited

U.S. PATENT DOCUMENTS

| | | | |
|---|---|---|---|
| 5,444,615 A | 8/1995 | Bennett et al. | |
| RE35,658 E | 11/1997 | Jeppesen | |
| 5,740,245 A | 4/1998 | Bennett et al. | |
| 5,815,392 A | 9/1998 | Bennett et al. | |
| 5,878,186 A | 3/1999 | Bennett et al. | |
| 5,884,256 A | 3/1999 | Bennett et al. | |
| 5,926,787 A | 7/1999 | Bennett et al. | |
| 5,940,800 A | 8/1999 | Bennett et al. | |
| 5,949,952 A | 9/1999 | Bennett et al. | |
| 5,950,194 A | 9/1999 | Bennett et al. | |
| 5,970,141 A | 10/1999 | Bennett et al. | |
| 6,023,675 A | 2/2000 | Bennett et al. | |
| 6,026,395 A | 2/2000 | Bennett et al. | |
| 6,055,531 A | 4/2000 | Bennett et al. | |
| 6,282,510 B1 | 8/2001 | Bennett et al. | |
| 6,990,445 B2* | 1/2006 | Ky | 704/235 |
| 7,016,844 B2* | 3/2006 | Othmer et al. | 704/270.1 |
| 7,174,296 B2* | 2/2007 | Bartosik | 704/260 |
| 2002/0049588 A1 | 4/2002 | Bennett et al. | |
| 2002/0049595 A1 | 4/2002 | Bennett et al. | |
| 2003/0101054 A1* | 5/2003 | Davis et al. | 704/235 |

* cited by examiner

*Primary Examiner*—Daniel Abebe
(74) *Attorney, Agent, or Firm*—Roetzel & Andress

(57) ABSTRACT

A transcription system and method that includes a transcription terminal for recording spoken words as units of transcribed text, and a conversion unit for translating the units of transcribed text into a generally accurate transcript of the spoken words and converting said transcript into a signal to be transmitted to an authorized receiving unit over a communication link. The system and method optionally includes any of a presentation object to be transmitted to the authorized receiving unit, a wireless access point for transmitting serial data representing the transcript, and suppression of an automatic network identifier.

13 Claims, 8 Drawing Sheets

REAL-TIME TRANSCRIPTION SYSTEM

FIELD OF THE INVENTION

The invention relates generally to real-time transcription, and, more particularly, to the generation of a transcript of spoken words as said words are spoken and presenting the transcript to authorized recipients wirelessly and without proprietary software in real time.

BACKGROUND OF THE INVENTION

During legal proceedings and other formal presentations a textual record is developed to document verbal testimony. For example, testimony offered during a trial is recorded by a court reporter using a device commonly referred to as a stenotype machine that has an abridged keyboard. Stenography was introduced in 1913 with the invention of the stenotype machine. This device, which contains twenty-five keys, allows the court reporter to press a combination of keys simultaneously to represent phonetic sounds, a word or a phrase that is being spoken. In this way, testimony can be recorded in shorthand with the stenotype machine as it is being presented without the undue delay that would result if the court reporter had to type every spoken syllable.

Like music, Braille or sign language, this shorthand language, which is referred to as stenography, is an entirely different and unique language, designed for the efficient recording of the spoken word. With traditional stenotype machines, the recorded key strikes, through dictation and typing are memorialized on a paper output. The translated document resulting from the dictation and typing efforts is an official transcript of the testimony.

Modern stenograph machines, commonly referred to as computer aided transcription writers ("CAT writers") or transcription terminals, evolved from the traditional machines in the early $20^{th}$ century. These CAT writers not only have the ability to print the recorded key strikes on a paper output, but also create an electronic copy of the recorded key strikes. Certain CAT writers also include a basic translation dictionary and a display screen where a preliminary translation of the recorded key strikes can be viewed as they are entered. The electronic copy of the recorded key strikes can be saved to digital storage media for delivery to a conversion unit, commonly referred to as a CAT machine or translation unit, which is typically a laptop computer running a translation software package that performs a complete translation of the shorthand text entered via the CAT writer following completion of the testimony. According to a more recent variation, the electronic copy of the recorded key strikes is transmitted in real-time to the translation unit as the key strikes are being recorded, allowing the key strikes to be translated into a transcript of the testimony as the key strikes are recorded. Regardless of the arrangement for delivering the recorded key strikes to the conversion unit, the conversion unit utilizes a piece of industry-specific software to translate the recorded key strikes into English, or another desired language.

With each use of a modern transcription system by a court reporter, a dynamic personal dictionary of the court reporter's specific stenographic style is generated, and is then updated with each subsequent use. New terminology, unique names and terms are continually added to the reporter's dictionary in order to grow the personal dictionary. The reporter's recorded key strikes translate against this personal dictionary to allow the most accurate translation possible.

The advent of the translational software packages and conversion units has also given way to other computer-aided advancements in the manner and speed of how testimony is received and utilized by third parties. During a legal proceeding, or other environment requiring the services of a stenographer, it is often desirable for the transcript to be made immediately available to the involved parties and any onlookers, collectively referred to as recipients. The process is currently performed by attaching a myriad of wires and cables to an ad-hoc network. It also requires the installation of proprietary software on the computing device of the intended recipient(s) to permit those connected to the network to view the translated record as it becomes available in real time. Following translation of the recorded key strikes by the conversion unit, the translated record, referred to as the transcript, can be communicated to the recipients' computing devices via a serial cable extending therebetween. However, conventional technology permits only a limited number of recipient computers, typically around 8, to be networked to the conversion unit at any given time.

Several attempts have been made to address these, and other, shortcomings of conventional transcription systems to make their use simple and secure, and to simultaneously deliver the transcript of recorded words to a large number of recipients. U.S. Pat. No. 5,369,704 to Bennett et al. is directed to a down-line transcription system for manipulating real-time testimony. As with most conventional transcription systems, the '704 patent discloses a system including a transcription terminal in the form of a stenographic machine, a computerized conversion unit for translating the shorthand recorded by the transcription terminal, and a plurality of portable computing devices used by parties to a legal proceeding. The conversion unit is described as a conventional laptop computer with an interface operatively connecting the conversion unit to the transcription terminal. Upon translating the shorthand transcribed units the conversion unit transmits a signal over a communication link to the laptops being used by the parties to the legal proceeding. According to one embodiment of the '704 patent, translated sentences are communicated from the conversion unit to the laptops via serial communication along the communication link. Secondary communication of the translated sentences can be facilitated by establishing a similar communication link from one of the laptops to a plurality of down-line laptops. The '704 patent also discloses a single communication link, or bus, using a TCP/IP protocol over an ethernet coaxial-cable link extending between an ethernet board in the CAT unit and each of the laptops. The '704 patent goes on to mention that other hardwired or wireless communication networks may also be implemented without providing any details surrounding the method of the wireless communication. And although it is disclosed that encryption of the signal becomes a requirement when the signal is to be disseminated amongst a wireless network of laptops, what the '704 patent describes as encryption is actually a method of transmission. The preferred encryption scheme described in Bennet et al. is the use of direct sequence spread spectrum transmission ("DSSS"). In contrast to encrypting a signal, DSSS is merely a protocol for dividing the signal into smaller quantities to be transmitted over the airwaves in a reliable manner. According to the DSSS protocol, a high data-rate code is combined with the signal at the sending station to divide the signal for transmission. This code is a redundant bit pattern for each signal bit that is to be transmitted, thereby providing a backup of the signal bits in the event that a signal data bit is damaged by interference during the transmission. Once divided, each quantity of the signal is allocated to a frequency channel across the available spectrum of frequencies. Although DSSS transmission divides the signal into smaller quantities, the signal is transmitted as a readily accessible, unencrypted signal. Without encryption, unauthorized parties can simply "tune in", or adapt their receiving units to receive transmitted signals allocated to a spectrum of frequencies, and intercept a signal transmitted according to DSSS transmission. Thus, even when using DSSS transmission, encryption of the signal is necessary to minimize unauthorized interception of the signal. And since DSSS transmission applies only to radio frequency transmission, there is no division of the signal by the DSSS transmission protocol when a hard-wired network is used as described by the '704 patent. The '704 patent also lists other exemplary communication links which might be implemented include token ring, parallel, infrared, and radio frequency. Upon receipt of the signal via the communication link, the laptops display the alphabetic and numeric text and provide a variety of tools for reviewing and evaluating what has been received.

U.S. Pat. No. 5,444,615 also to Bennett et al. is directed to a variation of the previously discussed down-line transcription system. According to the '615 patent, the transcription system includes a transcription terminal in the form of a stenographic machine and a conversion unit for translating shorthand text from the transcription terminal. A communication link is again established to communicate information from the conversion unit to laptops being used by parties to a legal proceeding. Over this communication link however the laptops are also connected to several libraries of information pertaining to the subject matter at issue. One such library is described as an outline library with which the laptops may interact. Attorneys may use the laptops to tailor an outline from the outline library to meet their specific needs. This tailored outline may be extracted and stored locally on the laptop, or, the tailored outline may be fully stored and maintained by the outline library alleviating the need for local maintenance. Col. 11, lines 49-53. Similar to the '704 patent, the communication link that facilitates the transfer of information between the conversion unit, the libraries and the laptops may be as described as in the '704 patent which is incorporated into the '615 patent by reference.

U.S. Pat. No. 5,740,245 to Bennett et al. is also directed to a similar down-line transcription system. In addition to the transcription terminal and the conversion unit, the '245 patent also discloses the receipt of text signals from the conversion unit by a laptop computer being used by an attorney. Upon receiving such signals, the laptop computer provides a variety of tools for reviewing and evaluating what has been received. Col. 8, lines 53-57. The signals from the conversion unit are transmitted via serial communication to the laptop or via a communication link in the form of a bus using TCP/IP protocol on an ethernet coaxial cable link using an ethernet board in each terminal. The ethernet coaxial cable described in the '245 patent and other patents discussed herein provides unstable transmission of data when compared to alternatives such as unshielded twisted pair wires. Other hardwired or wireless communication may also be implemented. Examples of the other communication links which may be implemented include token ring, parallel, infrared, and radio frequency. In the case of a wireless communication link, signals must be encrypted prior to their transmission. Col. 25, lines 10-21. The encryption is described in the '245 patent as a pseudo-random, secret spreading code common only to transceivers implementing DSSS transmission, however other encryption schemes may also be used. Again, as noted above, DSSS actually defines a transmission method, not an encryption method. A second communication link in the form of a telephone line attached to an internal modem of the attorney laptop also provides a communication link to additional remote interested parties. This second communication link is also described as optionally being a cellular radio frequency link. Col. 26, lines 47-58.

U.S. Pat. No. 5,815,392 is also directed to a down-line transcription system. The down-line transcription system includes a transcription terminal as well as a conversion unit. In addition to communicating translated text over a communication link to a laptop being used by an attorney, the '392 patent teaches that the attorney can download a variety of information from a remote storage location. The attorney has the option to download all or a part of the information from a remote location. Col. 16, line 59-Col. 17, line 2.

U.S. Pat. No. 5,815,639 discloses the conventional transcription terminal and conversion unit for providing real-time translation of shorthand text. A conversion unit transmits both the exact translation and where necessary the phonetic shorthand text down-line to an attorney terminal. The attorney terminal is equipped with suitable software that facilitates the display of the received text on a display of the attorney's terminal.

U.S. Pat. No. 5,950,194 discloses a similar down-line transcription system. According to the '194 patent, a transcription terminal is linked to a conversion unit for translating shorthand textual objects from the transcription unit. The translated text is transmitted over a communication link to an attorney's terminal in real time thereby permitting the attorney to view and edit testimonial evidence during a legal proceeding. The attorney's terminal is provided with various search modification aids and contextual analysis tools that allow the attorney's rapid access to needed information. Col. 5, lines 50-53.

U.S. Pat. No. 5,949,952 discloses a transcription system including a transcription terminal in the form a stenographic machine and a conversion unit operatively coupled to the stenographic machine. Audio and video data capture devices such as a video camera and tape recorder are also operatively coupled to the conversion unit. The recorded audio and video are synchronized by the conversion unit and are stored in a remote database. Remote attorney terminals can access the database and receive virtual real-time video and audio on demand. The transcription system performs storage and playback of video and audio transcripts along with the textual transcript and synchronization information so that the transcript can be selectively parsed and reviewed during and after a legal proceeding. Col. 14, lines 57-63.

U.S. Pat. No. 5,970,141 discloses a down-line transcription system having an encryption object to insure secure transmission of recorded testimony. An attorney terminal initiates communication with a conversion unit by constructing a log-in packet including digital information consisting of a source identifier, identifying itself as the source of the communication, a destination identifier, identifying the reporter terminal at the destination, and a pointer indicating the attorney terminal's current position which is defined as the last communication received from the reporter's terminal. Col. 29, lines 18-29. The attorney terminal transmits the log-in packet to the reporter terminal and waits for a response. Upon receiving a log-in packet, the reporter terminal enters the source identifier into a log-in list and transmits a responding packet containing a source identifier, destination identifier and the number of the most recently transmitted information. Col. 29, lines 40-46.

In addition to the use of a transcription system in a trial setting to provide real-time viewing of the transcript, there are many other settings that require real-time delivery of the transcript to be viewed, as well as retained and manipulated. These additional settings typically make it unpractical to physically wire the intended recipients to an ad-hoc, wired network and ensure the presence of proprietary software on the recipients' computing devices. Examples of such additional settings include the real-time provision of a working transcript to:

the hearing impaired in an educational environment;

delegates in a political environment where the exact meaning of what is said is required to be memorialized in visible text as it occurs;

those in an environment where instant visualization of the spoken word assists in the understanding of English as a secondary language;

members of the reporting press to aid in the accuracy of publicly disseminated information; and members of the legal community to assist in the efficient gathering of testimony and, thus, reducing the cost of litigation.

Accordingly, there is a need in the art for a real-time transcription system that eliminates the requirement of proprietary on each authorized recipient's terminal to receive a transcript of spoken words in real time. The transcription system should establish secure communications between a conversion unit and an authorized recipient, and should be capable of transmitting the transcript to several authorized recipients simultaneously.

SUMMARY OF THE INVENTION

It is an object of the present invention to provide a generally reliable, secure and compatible we to present a developing transcript to an audience in real time.

In accordance with one general aspect of the present invention, there is provided a transcription system for providing real-time access to a transcript being developed from spoken words. The transcription system includes a transcription terminal for recording spoken words as units of transcribed text, a conversion unit for translating the units of transcribed text into a generally accurate transcript of the spoken words and converting the transcript into a signal to be transmitted to an authorized receiving unit over a communication link, and a presentation object to be transmitted to the authorized receiving unit for presenting the transcript of the spoken words.

In accordance with another aspect of the present invention, there is provided a method for providing real-time access to a transcript being developed from spoken words. The method includes the steps of recording the spoken words as units of transcribed text, translating the units of transcribed text into a generally accurate transcript of the spoken words, converting the transcript of the spoken words into a signal to be transmitted to an authorized receiving unit over a communication link, transmitting a presentation object to the authorized receiving unit for presenting the transcript, and transmitting the signal.

In accordance with another embodiment of the present invention, there is provided a transcription system for providing real-time access to a transcript being developed from spoken words. The transcription system includes a transcription terminal for recording spoken words as units of transcribed text, a conversion unit for translating the units of transcribed text into a generally accurate transcript of the spoken words and converting the transcript into serial data, and a wireless access point for transmitting the serial data to an authorized receiving unit over a wireless communication link.

In accordance with another embodiment of the present invention, there is provided a method for providing real-time access to a transcript being developed from spoken words. The method includes the steps of recording the spoken words as units of transcribed text, translating the units of transcribed text into a generally accurate transcript of the spoken words and converting the transcript into serial data, and transmitting the serial data from a wireless access point over a wireless communication link to be received by an authorized receiving unit.

In accordance with another embodiment of the present invention, there is provided a transcription system for providing real-time access to a transcript being developed from spoken words. The system includes a transcription terminal for recording spoken words as units of transcribed text, a conversion unit for translating the units of transcribed text into a generally accurate transcript of the spoken words and converting the transcript into a signal, a security object that prevents an automatically assigned network identifier from being transmitted to a network including at least one authorized receiving unit, and a manually assigned network identifier to be entered at a receiving unit to verify authorization of the receiving unit to receive the transcript of the spoken words.

In accordance with another embodiment of the present invention, there is provided a method for providing real-time access to a transcript being developed from spoken words. The method includes the steps of recording the spoken words as units of transcribed text, translating the units of transcribed text into a generally accurate transcript of the spoken words, converting the transcript into a signal, suppressing transmission of an automatically generated network identifier to a network, manually assigning a network identifier that is to be entered at a receiving unit to verify authorization of the receiving unit to receive the transcript, and transmitting the signal upon verifying authorization of the receiving unit to receive the transcript.

These and other aspects of the invention are herein described in detail, with reference to certain preferred and alternate embodiments which are illustrative but not exclusive of various ways in which the principles and concepts of the invention can be embodied and practiced.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTIONS OF PREFERRED AND ALTERNATE EMBODIMENTS

Figure 1:
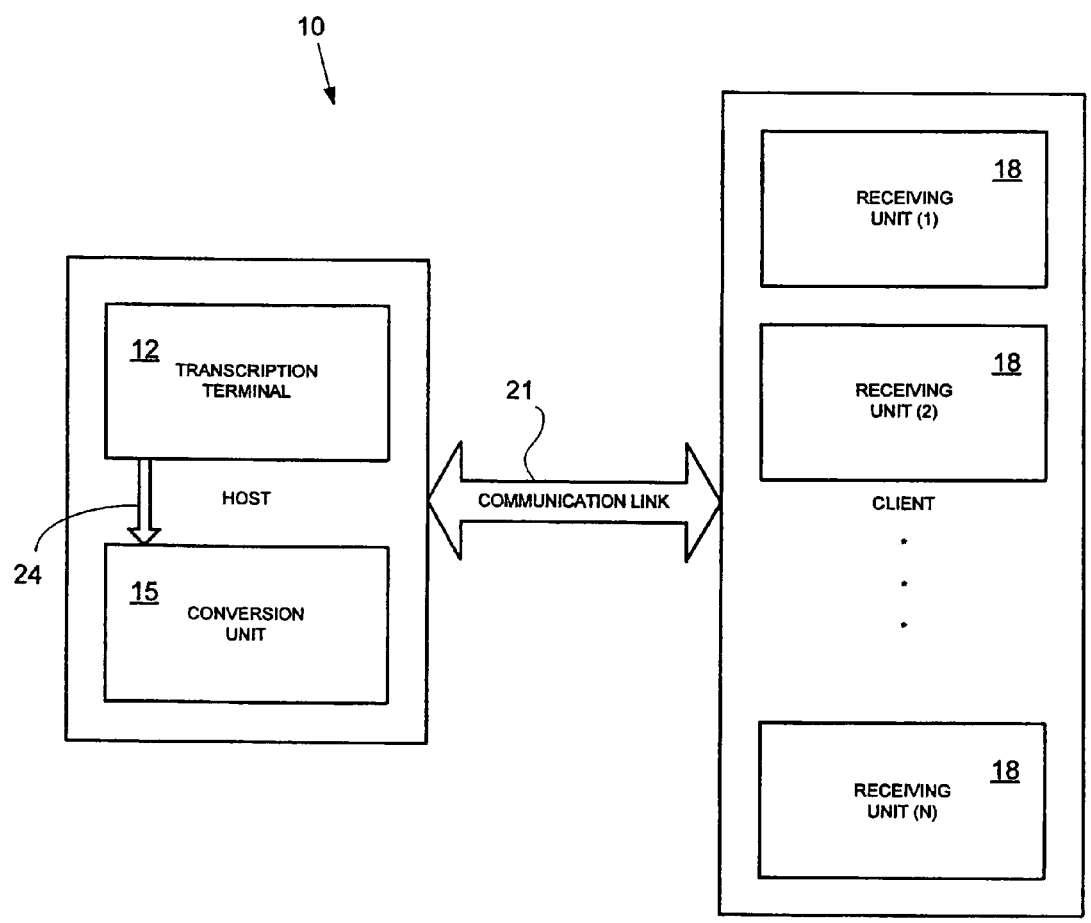
FIG. 1 is an illustrative arrangement of a transcription system in accordance with an embodiment of the invention.

Certain terminology is used herein for convenience only and is not to be taken as a limitation on the present invention. Further, in the drawings, certain features may be shown in somewhat schematic form.

Initially, it is worth noting that the present invention can be employed in a variety of settings to provide real-time access to a transcript of words being spoken by a participant in any event. For purposes of providing a clear and detailed description of the present invention, however, the present invention is discussed below as it is used to create a transcript of spoken words offered as testimony during a legal proceeding. Alternate embodiments of the present invention as used in other exemplary settings are also discussed, but it should be noted that this is not an exhaustive discussion of all possible embodiments of the present invention.

Authorized receiving unit 18, as used herein, refers to a terminal or station that has been authorized to receive a transcript of testimony offered at a trial or other setting. The terminal or station can be a portable computer, desktop computer, digital display device, audio producing device, and any other device that can be equipped to receive a communication signal. The authorized receiving unit 18 includes appropriate communication receiving equipment to receive signals transmitted in accordance with the present invention. In contrast, a station or terminal referred to herein as an unauthorized receiving unit may be equipped with similar communication receiving equipment similar to that of the authorized receiving unit 18, but the unauthorized receiving unit lacks permission to receive the transcript. Any receipt of the transcript by an unauthorized receiving unit is an unintended interception of the signal.

Similarly, the terms audience and intended audience, as used herein, refer to those who are to observe the transcript of testimony by way of the authorized receiving units 18. Individual members of the intended audience are referred to herein as audience members.

Turning to the Figures, FIG. 1 shows a block diagram of an embodiment of a transcription system for providing real-time access to a transcript being developed from spoken words. The transcription system comprises a transcription terminal 12 for recording spoken words as units of transcribed text, a conversion unit 15 for translating the units of transcribed text into a generally accurate transcript of the spoken words in real time and converting the transcript into a signal to be transmitted to an authorized receiving unit 18 over a communication link 21. A presentation object can be transmitted to the authorized receiving unit 18 for presenting the transcript of spoken words to an intended audience in real-time virtually as the transcript is translated.

The transcription terminal 12 in the illustrated embodiment is a stenographic machine having an abridged keyboard. Stenographic machines are commonly used by a court reporter to record testimony during a legal proceeding in a shorthand language. The shorthand language is based on the phonetic pronunciation of words. Typically, each keystroke includes depressing a single key or a combination of keys to represent a syllable, or other unit of transcribed text, spoken by a participant of the legal proceeding. These recorded units of transcribed text are to be translated into words to produce a generally accurate transcript of the words that were actually spoken. By generally accurate it is meant that the translation of the transcribed units of text will accurately represent the spoken words to a reasonable degree. The translation in many cases will not be perfect due to the use of uncommon spoken words by a witness, nonverbal communications between participants, an error by the stenographer in recording the spoken words, and other such events. In these cases, the transcript is to be reviewed, or scoped, by an operator with the aid of a digital computer having a supplemental translation library to minimize the inaccuracies in the transcript. Regardless of whether the transcript is scoped, however, the transcript will provide a generally accurate record of the words spoken during the legal proceeding.

In addition to the stenographic machine, the transcription terminal 12 can suitably be a keyboard operatively coupled to a digital computer, an audio recorder, a video recorder, and any other type of data entry device. Further, the units of transcribed text recorded with the transcription terminal 12 are capable of being rendered into a format to be electronically transmitted to the conversion unit 15.

The conversion unit 15 is operatively coupled by a communication link 24 to receive the units of transcribed text in an electronic form from the transcription terminal 12. Units of transcribed text received by the conversion unit 15 are translated into words to create a living transcript of the actual words spoken during the legal proceeding. Since it is living, the transcript is updated at predetermined intervals until the transcript is complete. For example, the translation can occur on a sentence-by-sentence basis where transcribed units of text are translated into words when a complete sentence has been received by the conversion unit 15 as indicated by the receipt of appropriate punctuation.

Generally, the conversion unit 15 is a portable digital computer, commonly referred to as a laptop or notebook, that can be operatively coupled to the transcription terminal 12 with a serial cable, infrared signal, radio frequency signal, and the like, which form the communication link 24. Other embodiments of the conversion unit 15 include a desktop computer, server, workstation, etc. . . . Computer aided transcription software ("CAT software") including computer readable instructions for controlling operation of the conversion unit 15 in performing the necessary translations is stored in a memory accessible to the conversion unit 15 such as a hard disk, ROM, or RAM shown in FIG. 2. The CAT software causes transcribed units of text received from the transcription terminal 12 to be translated into the words that were represented by the units of transcribed text, and the newly translated words to be displayed on a display device such as a monitor provided to the conversion unit 15. An operator, which is typically the court reporter, disposed adjacent to the monitor can evaluate and correct the translated words displayed before the transcript is transmitted to authorized receiving units 18.

Figure 2:
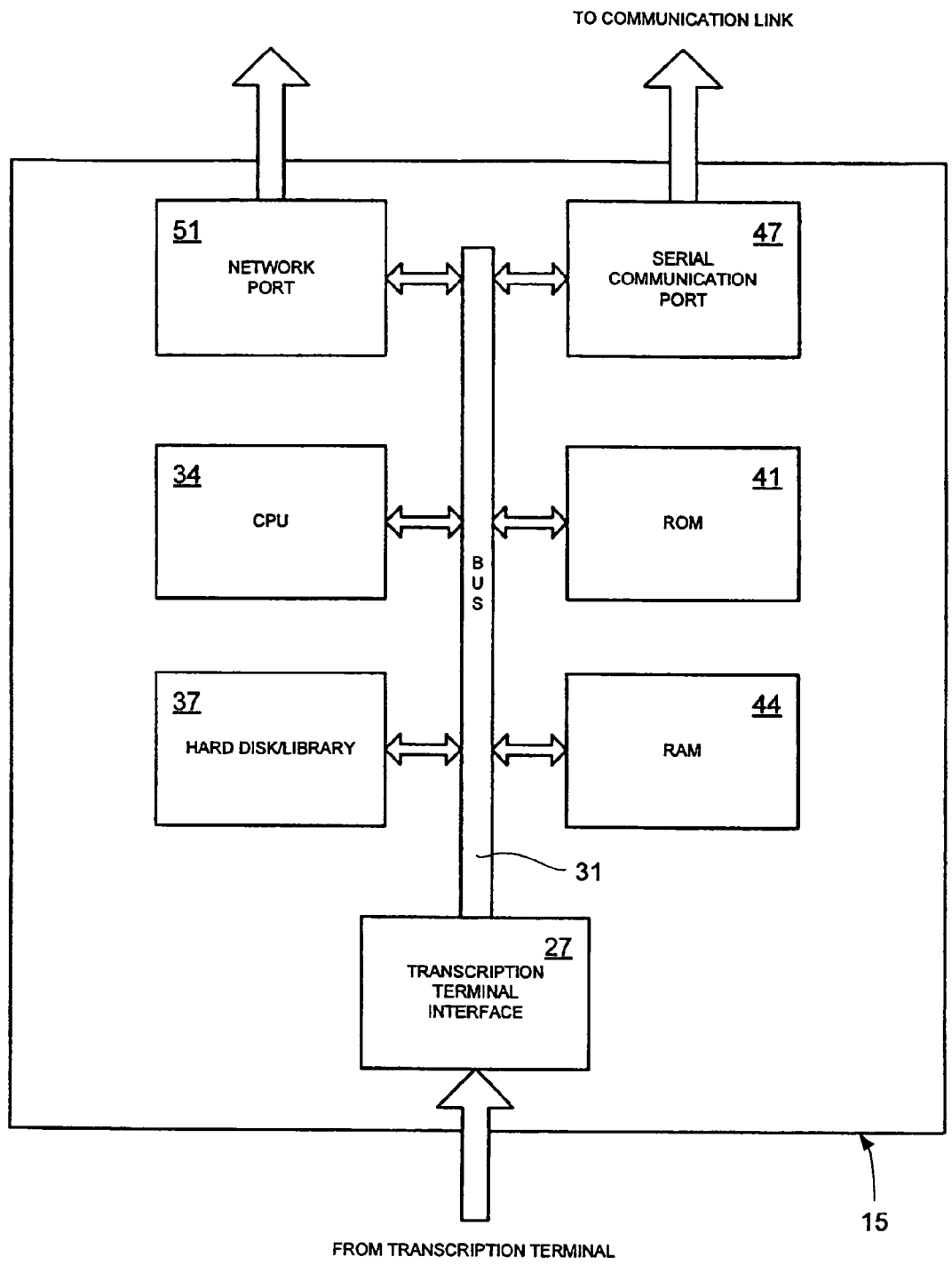
FIG. 2 is an illustration of data communication paths for communication with a conversion unit.

FIG. 2 illustrates an example internal arrangement of a conversion unit 15 according to the present invention. Units of transcribed text are to be received by the conversion unit 15 at a transcription terminal interface, which communicates with the transcription terminal 12 over the communication link 24. An information bus serves to transport the received units of transcribed text to and from other components of the conversion unit 15. A central processing unit ("CPU") coordinates the operation of the various components of the conversion unit 15 to perform the translation of the transcribed units of text into words according to instructions included in the CAT software. Translating the units of transcribed text into words is accomplished through the use of correlations between the units of transcribed text and their equivalent words. These correlations can be retrieved from a library of correlations stored within a computer readable memory such as the hard disk, ROM, RAM, or other computer accessible database of correlations. Depending upon the intended audience that the transcript will be presented to, the library can include correlations that allow the conversion unit 15 to translate the units of transcribed text into any desired language. Further, the library can be continuously updated to reflect the court reporter's own unique style of recording spoken words. New terminology, unique names and terms are continually added to the court reporter's dictionary to maximize the accuracy of the translation.

Words translated as part of the transcript that have been scoped by the court reporter are converted by the conversion unit 15 into a signal to be transmitted to an authorized receiving unit 18 over the communication link 21. According to one embodiment, the signal includes serial data representing the translated words that make up a portion of the transcript. Serial data comprises a string of 6 to 8 bits that are to be transmitted in order, one bit at a time, through a serial communication port ("COM port") 47. The COM port 47 conforms to recommended standard 232C ("RS-232C") or recommended standard 422 ("RS-422") approved by the Electronic Industries Alliance, however, a signal to be transmitted through a COM port 47 conforming to related and successor recommended standards are also within the scope of the present invention. Such a signal comprising serial data will be referred to generally herein as a serial signal.

A network port 51 is also provided to communicate with the bus of the conversion unit 15. The network port 51 is a transfer control protocol/Internet protocol ("TCP/IP") network interface, however, interfaces with other networking protocols such as user datagram protocol ("UDP") are also within the scope of the network port 51 of the present invention. Network interfaces are known to include a port compatible with an RJ-45 connector, for example, which is common to most networking cables. Alternately, the networking port can be compatible with a universal serial bus ("USB"), and/or any other type connector that can be used to establish a communication link according to a networking protocol.

Figure 3:
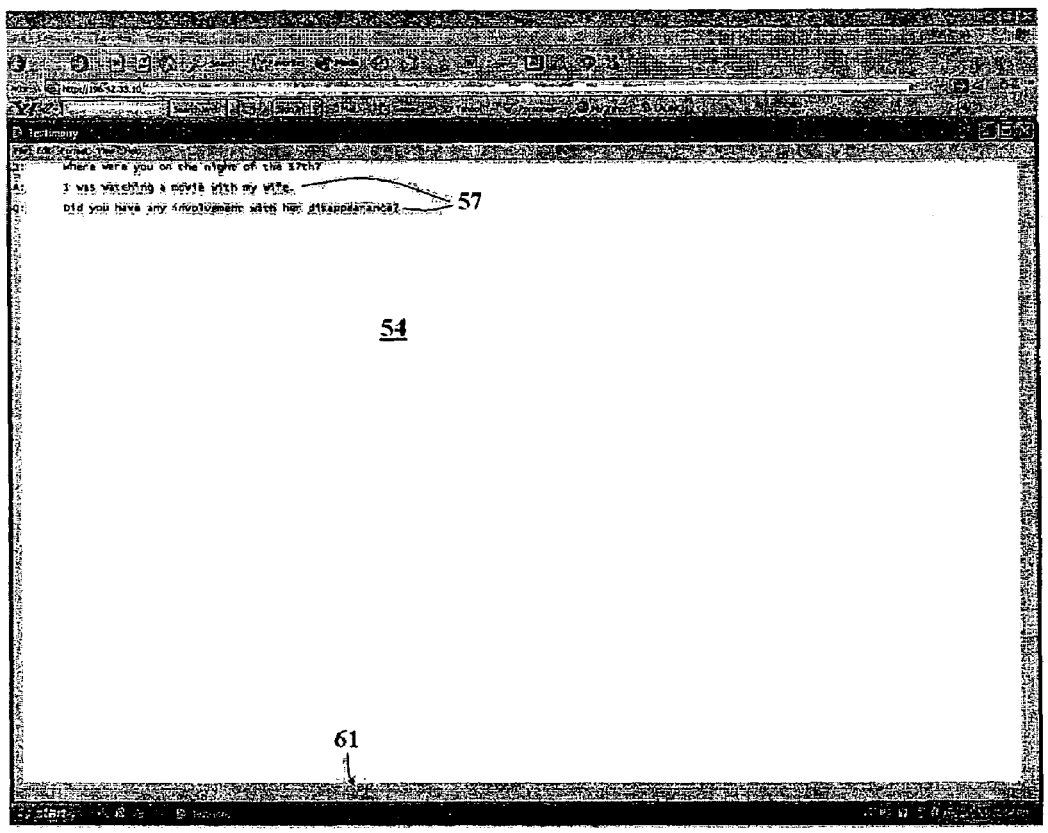
FIG. 3 shows a user interface of a presentation object to be display by an authorized receiving unit for visually presenting a transcript.

FIG. 3 illustrates an example of a presentation object in accordance with the present invention displayed by a display device (not shown) operatively coupled to the authorized receiving unit 18. The presentation object is embodied as a set of computer-readable presentation code, or logic, that can be utilized by the authorized receiving unit 18 to present the transcript to an audience member in real time as the transcript is generated from the translated units of transcribed text. As illustrated in FIG. 3, a graphical user interface ("GUI") is generated by the authorized receiving unit 18 according to instructions in the presentation code. The GUI displays lines of text in a window as they are translated from the units of transcribed text recorded with the transcription terminal 12 and transmitted by the conversion unit 15. Although FIG. 3 shows an example of a presentation object in the form of a GUI having a window in which lines of the transcript are displayed in real time, the presentation object according to the present invention can optionally present the transcript visually, audibly, and in any other manner. For example, the presentation object can be an audio playback program that is operable with the authorized receiving unit 18 for reading the transcript aloud as it is developed and transmitted by the conversion unit 15.

According to one embodiment, the presentation object is a JAVA script object, or applet, that can be operated within any JAVA-enabled software running on the authorized receiving unit 18. JAVA-enabled web-browsing software such as that marketed under the tradename Internet Explorer by Microsoft Corporation provided to the authorized receiving unit 18 can be used as the JAVA-enabled software for executing the JAVA script object. The versatility of the JAVA language allows the JAVA script object to be executed by an authorized receiving unit 18 conforming to any platform and architecture so long as the authorized receiving units 18 include JAVA-enabled software. The JAVA script object or applet can be transmitted to the authorized receiving unit 18 from a remote location such as a web server, the conversion unit 15, local-area-network server, and any other remote location to display the transcript to the audience. Transmission of such a presentation object can be automatic upon a request to receive the transcript entered at the authorized receiving unit 18, or, transmission of the presentation object can be manually actuated by an audience member by selecting an appropriate option displayed by the authorized receiving unit 18. Further, the presentation object can optionally be included in a transmission of a portion of the transcript itself.

Again, as described above, the presentation object can be transmitted from a remote location regardless of the manner in which the presentation object presents the transcript to the audience. Accordingly, a presentation object that recites the contents of the transcript aloud to the audience can also be transmitted to the authorized receiving unit 18 to present the transcript as it is received at the authorized receiving unit 18.

Figure 4:
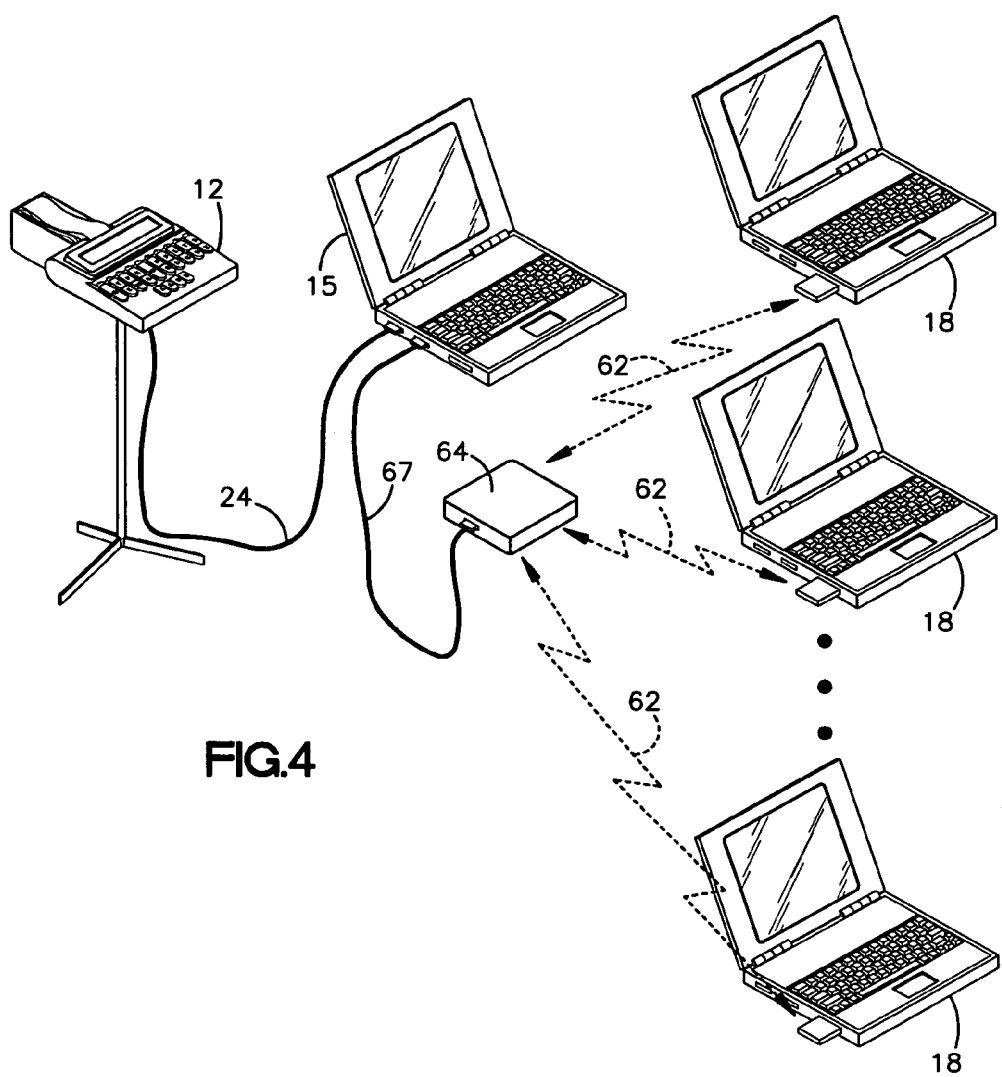
FIG. 4 is an illustrative arrangement of a transcription system for transmitting a transcript to authorized receiving units as part of a local area network over a wireless communication link.

The communication link 21 over which the words translated by the conversion unit 15 are to be transmitted to the authorized receiving unit 18 is established by a suitable network connection. FIG. 4 illustrates an embodiment of a transcription system comprising a network connection in the form of a wireless local communication link 62. A wireless access point 64 is operatively connected by a communication link 67 such as an ethernet cable to receive data representing the translated words from the conversion unit 15 via the network port 51 and transmit that data to the authorized receiving unit 18. In addition to the ethernet cable shown in FIG. 4, the communication link 67 between the conversion unit 15 and the wireless access point 64 can be a conventional serial cable, RF link, infrared link, and any other type of data-transmission path capable of transporting data from the conversion unit 15 to the wireless access point 64. Data received by the wireless access point 64 from the conversion unit 15 is broadcast at one or more radio frequencies to a predetermined IP address as an encrypted signal. Encrypting the signal for transmission allows authorized receiving units 18 to receive the signal and present the transcript to the audience while minimizing receipt of the signal by unauthorized receiving units.

According to one embodiment of the present invention, a wireless access point 64 is operatively coupled to the network port 51 of the conversion unit 15. Serial data representing the signal to be transmitted to the authorized receiving units 18 is originally destined to be transmitted from the conversion unit 15 via the COM port 47. Data-diversion software including computer readable logic installed in the memory of the conversion unit 15 redirects the flow of serial data from the COM port 47 to the networking port through which the serial data is transmitted for communication with the wireless access point 64. From there, the serial data is transmitted to a predetermined IP address where it can be received by the authorized receiving units 18.

Alternately, a wireless access point 64 can be operatively connected to the COM port 47 of the conversion unit 15 by a serial cable extending therebetween. In such a case, the serial data forming the signal is to be transmitted from the conversion unit 15 via the COM port 47. This serial data is then transmitted by the wireless access point 64 to be received by authorized receiving units 18. For example, a so-called Serial Lan provided with an RS-232C COM port can be operatively connected to the COM port 47 of the conversion unit 15. The Serial Lan transmits the RS-232C data, or serial data, transmitted from the COM port 47 of the conversion unit 15 to another Serial Lan, wireless access point, router, antenna, and PCMCIA card, as appropriate, to transmit the data in a manner that it can be received by authorized receiving units 18.

Although the wireless access point 64 can be used to transmit serial data as described above, a conventional communication link established between the network port 51 of the conversion unit 15 and the wireless access point 64 without serial data redirection is also contemplated by the present invention. In such an embodiment, the wireless access point 64 can be adapted to communicate data in compliance with TCP/IP with a wide area network 77 as described in detail below. Further, there is no requirement that the communication link 62 between the transcription system 10 and authorized receiving units 18 be wireless. The communication link can be established to form a network arranged in any manner including, but not limited to, a modified star-topology (both wired and wireless), and any other arrangement.

The wireless access point 64 can be any device that communicates the translated words of the transcript to the authorized receiving unit 18 without the necessity of a wire physically extending between the authorized receiving unit 18 and the conversion unit 15. For example, the wireless access point 64 can transmit and receive signals over a range of radio frequencies according to one or more of the 802.11 standards promulgated by the Institute of Electrical and Electronics Engineers. The wireless access point 64 can broadcast a signal to all receiving units within range of the wireless access point 64, or, it can multicast the signal to only those authorized receiving units 18 by encrypting a broadcast signal. By transmitting the translated words of the transcript with the wireless access point 64, the number of receiving units that can simultaneously receive the transcript is much greater than the number of receiving units that can receive the translated words of the transcript with an ad-hoc, wired network. Preferably, the wireless access point 64 can support any number of authorized receiving units 18 including 128 or more wireless communication links simultaneously with the respective number of authorized receiving units 18.

Use of a wireless transmission protocol to transmit the signal representing the transcript requires the use of encryption to minimize the number of unauthorized units that can receive and observe the transcript. Examples of wireless encryption contemplated by the present invention include 64/128-bit wireless encryption protocol (also commonly referred to as wired equivalent privacy, and hereinafter referred to as "WEP"), and any other encryption protocols compliant with the 802.11x standards, wherein x represents any of the lettered versions of the 802.11 standards promulgated by IEEE.

To provide additional security to a signal transmitted over a local wireless communication link, transmission of a network identifier over the local wireless communication link 62 can be suppressed. A network identifier commonly referred to as a service set identifier ("SSID") is commonly transmitted to be received and compared by all receiving units. Receiving units subscribing to a network having that SSID are permitted to communicate with the wireless network while members of local wireless networks having another SSID are not permitted to so communicate. Even when the signal transmitted over the wireless communication link 62 is encrypted, the SSID is transmitted in plain text, meaning that anyone receiving the encrypted text cannot readily observe the contents of the signal, but can identify the SSID. Although this is only one of a plurality of information pieces that must be obtained to receive and observe the subject of the transmission, transmitting the SSID essentially gives away one these information pieces.

Instead, transmission of the SSID can be suppressed according to the present invention, and a manually assigned network identifier assigned to the network that will comprise the authorized receiving units 18. The manually assigned identifier can be any word, number, string of characters, and any combination thereof and can be conceived at the moment when the network is to be established. Once conceived, the manually assigned identifier is to be conveyed to the intended audience members by word of mouth, or other form of communication having a minimal threat of interception. To establish a communication with the network that will verify the authority of the receiving units to receive and observe the contents of the transcript, the receiving units are to enter the manually assigned network identifier when prompted while the authorized receiving units 18 are initially establishing communications with the network.

The embodiment of the transcription system shown in FIG. 4 also allows for transcript requests and other communications from the authorized receiving units 18 to be made over the wireless communication link 62. Thus, the wireless access point 64 acts as a transceiver having the ability to both transmit and receive signals. Further, in the case of a presentation object that is to be transmitted to the authorized receiving unit 18 from the conversion unit 15, the presentation object can be delivered to the wireless access point 64 and thereafter transmitted over the wireless communication link 62 to the authorized receiving unit 18.

Figure 5:
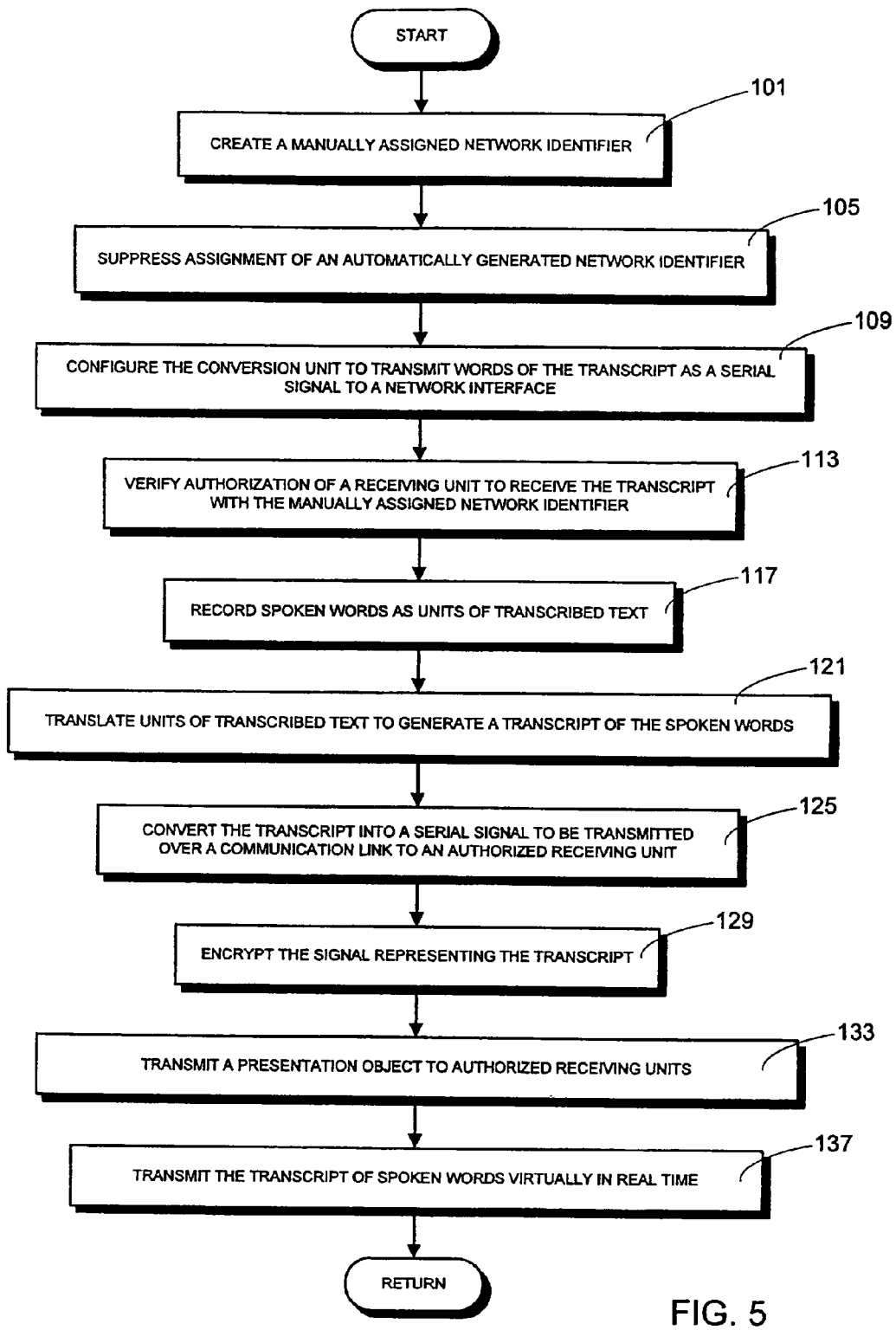
FIG. 5 is a flow diagram illustrating a method transmitting a transcript of spoken words to one or more authorized receiving units in real time.

FIG. 5 shows an exemplary flow diagram illustrating a method of providing a transcript of words spoken to an intended audience in real-time. In use, the court reporter or other administrator of the soon-to-be network conceives of the manually assigned network identifier at step 101 and conveys that manually assigned network identifier to the intended audience members. By using the manually assigned network identifier, transmission of the SSID can be suppressed at step 105 to prevent unauthorized receiving units from intercepting, referred to as sniffing, the SSID and possibly infiltrating the network.

The conversion unit 15 is configured at step 109 to transmit the transcript as it is generated from the translation of the units of transcribed text to a network interface. In the embodiment illustrated in FIG. 4, this can be accomplished by redirecting serial data intended for the COM port 47 to the network port 51 with the data-diversion software. Alternately, the Serial Lan access point can be operatively connected to the COM port 47 of the conversion unit 15 to receive serial data therefrom. Again, a conventional connection to the network port 51 can also be used to communicate data to the wireless access point 64, a router, a wide area network 77, etc, without departing from the scope of the present invention.

With the conversion unit 15 so configured, those receiving units authorized to receive the transcript are to be identified at step 113. An audience member attempting to establish communications with a wireless network will be prompted to enter the manually assigned network identifier. The conversion unit 15 will compare the entry by each audience member requesting access to the transcript to the manually assigned network identifier as specified by the court reporter or administrator. The court reporter or administrator can manually verify each entry, or, can input the manually assigned network identifier to the conversion unit 15, which will perform the necessary comparison to very the authority of the audience members to receive and observe the transcript.

Once the network has been established and the trial commences, words being spoken as part of the trial are recorded as units of transcribed text with the transcription terminal 12 at step 117. Audience members can still enter the network according to the steps described above at any point in the trial. These units of transcribed text can be preliminarily translated by a rudimentary dictionary provided to the transcription terminal 12 and displayed for review by the court reporter as they are recorded. The units of transcribed text are communicated to the conversion unit 15 where they will be translated by the CAT software with the aid of a library of correlations. Generally, the translation processes performed by the transcription terminal 12 and the conversion unit 15 are collectively represented at step 121.

The translated transcript is converted into a serial signal according to one embodiment of the present invention to be transmitted over the communication link 62 to the networked authorized receiving units 18 at step 125. The serial data can be modulated for transmission according to the aforementioned DSSS protocol, or any other protocol that effectuates the transmission of the signal representing the transcript according to the particular network established. Additionally, for a wireless communication link 62 and when transmitting the transcript over a wide area network 77, the signal representing the transcript is encrypted at step 129 according to 64 or 128-bit WEP or other encryption scheme compliant with the 802.11 standards.

A presentation object can be transmitted from the conversion unit 15 or other location remote from the authorized receiving units 18 over the communication link 62 to be received by the authorized receiving units 18 at step 133. The presentation object can be a JAVA-script object that can be executed within any JAVA-enabled computer application such as a web browser for example. Once the presentation object has been received by the authorized receiving units 18 and executed, the transcript is transmitted over the communication link to be received by the authorized receiving units 18 and presented to the intended audience in real-time at step 137.

Figure 6:
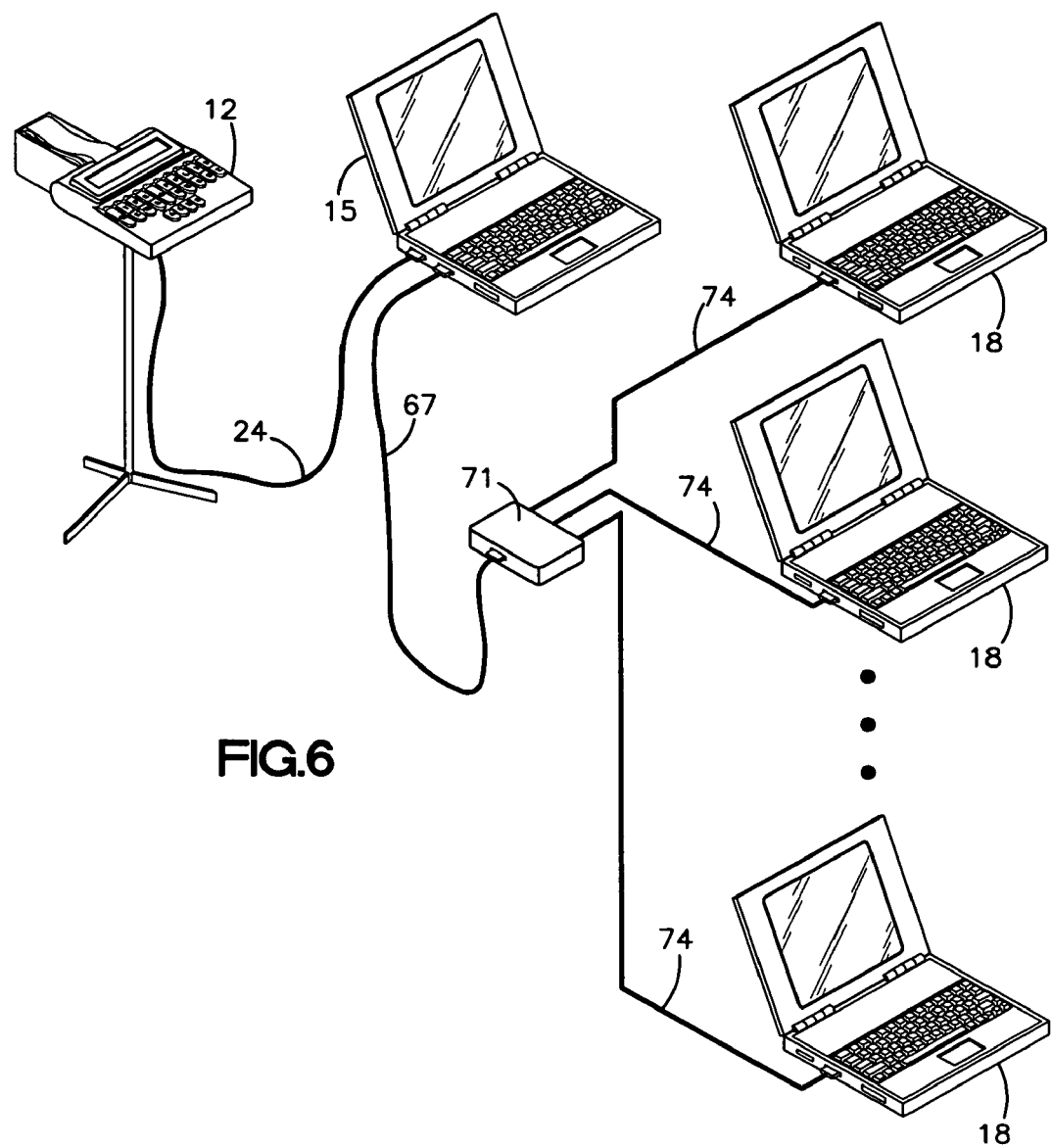
FIG. 6 is an illustrative arrangement of a transcription system for transmitting a transcript to one or more authorized receiving units over a hardwired communication link establishing a local area network.

FIG. 6 shows another embodiment of the transcription system according to the present invention comprising a communication link 74 in the form of a wired local network, also commonly referred to as an ad-hoc network. Similar to the embodiment shown in FIG. 4, the present embodiment includes a transcription terminal 12 operatively connected by an ethernet cable or other type of communication link 24 to a conversion unit 15 to translate units of transcribed text recorded by the transcription terminal 12 into words. The communication link 74 is established by communicating a signal representing the words of the transcript to a hub, which acts as a node to which authorized receiving units 18 can be linked. Each authorized receiving unit 18 can be linked to the hub by an ethernet cable extending between a network port 51 of the receiving unit and the hub, or by another communication link described above, to transmit and receive signals to and from the hub.

The method described above can be adapted for this particular embodiment. A request to receive the transcript made by the receiving unit is communicated to the conversion unit 15 through the hub, and, in response, the conversion unit 15 verifies authorization of the receiving unit to receive the transcript. Upon verifying the authorized status of the receiving unit, the presentation object can optionally be transmitted from the conversion unit 15 to the hub, and in turn, to the authorized receiving unit 18. This can be repeated N times to verify authorization of N receiving units to receive the transcript and to transmit the N receiving units with the presentation object.

Figure 7:
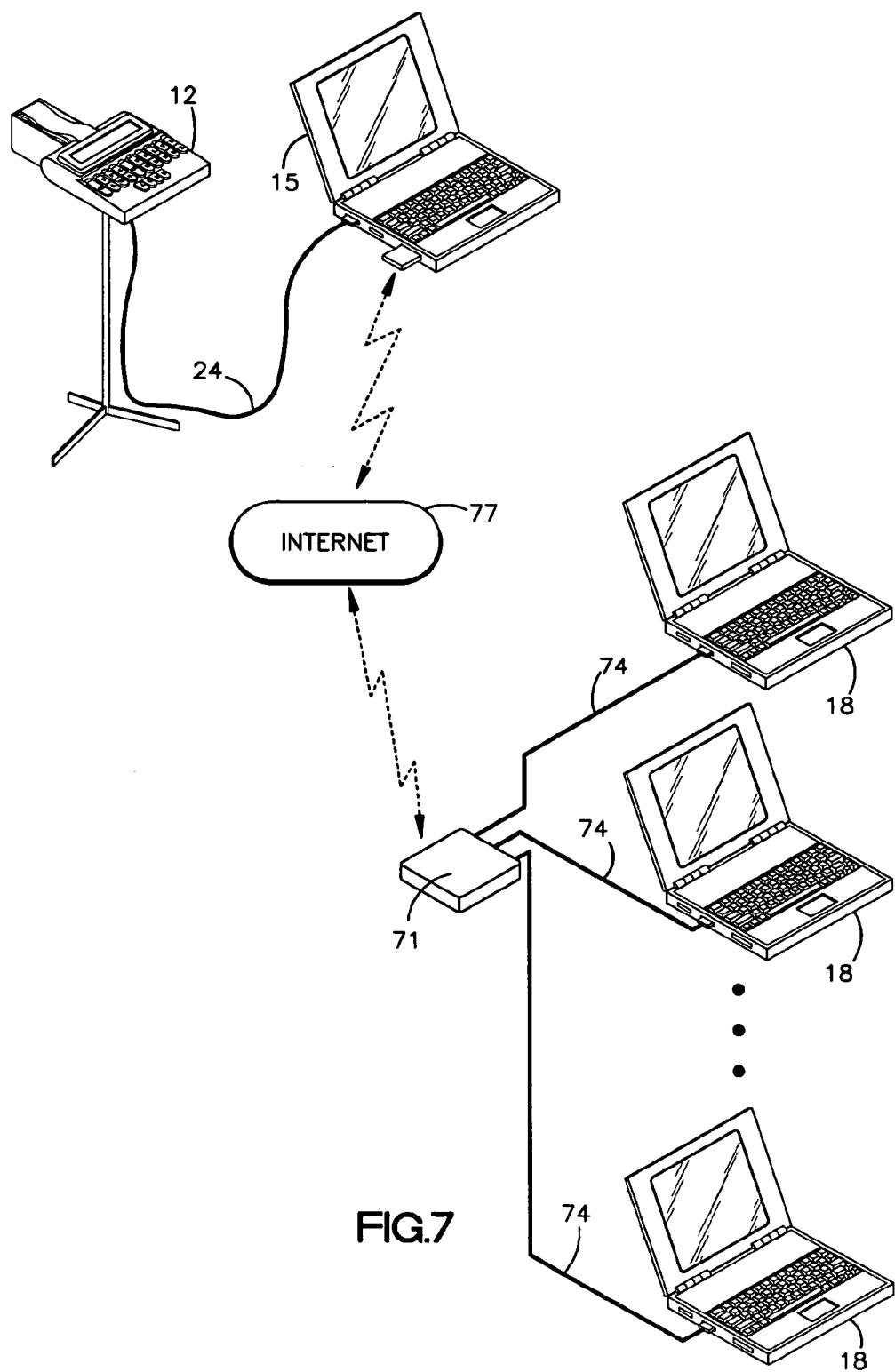
FIG. 7 is an illustrative arrangement of a transcription system for transmitting a transcript to one or more authorized receiving units belonging to a wide area network.

FIG. 7 shows yet another embodiment of the present invention wherein the communication link 74 is established over a wide area network 77 such as the Internet, for example. Again, the method described above can be adapted to communicate the transcript in real time to authorized receiving units 18 networked in this manner. In this case, however, the transcript is transmitted to a dedicated network address of the wide area network 77, from where it can be retrieved by remotely located authorized receiving units 18. Just as before, communication with the wide area network 77 can be established via a wireless communication link by any of the conversion unit 15, hub, and authorized receiving units 18.

Figure 8:
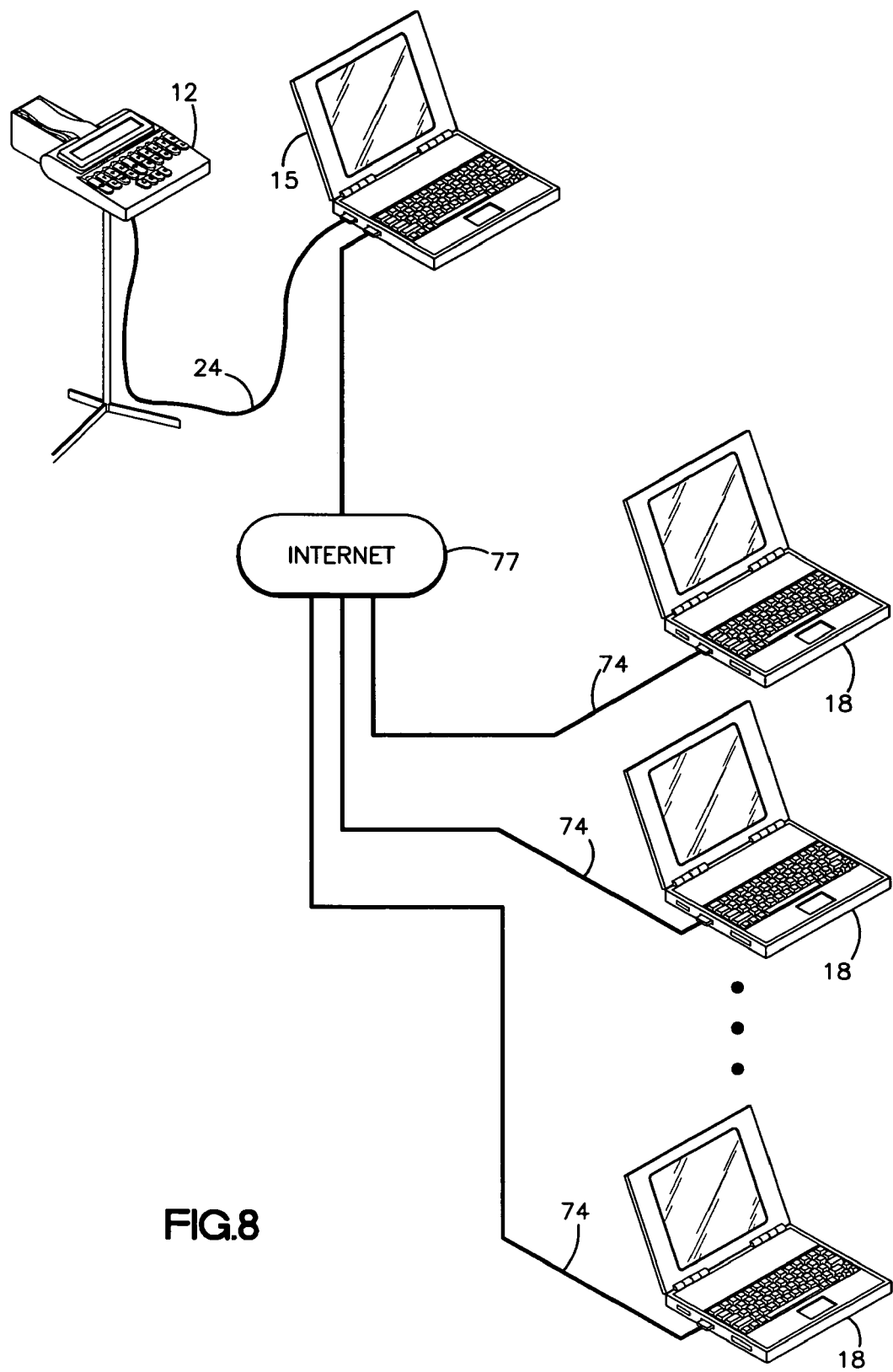
FIG. 8 is an illustrative arrangement of a transcription system for transmitting a transcript to one or more authorized receiving units belonging to a wide area network.

FIG. 8 illustrates another embodiment that varies from FIG. 7 by the use of a hardwired connection to establish communication with the wide area network 77. Again, the method described above is adaptable to facilitate real-time presentation of the transcript to intended audience members, including remotely located intended audience members.

From the above description of the invention, those skilled in the art will perceive improvements, changes and modifications. Such improvements, changes and modifications within the skill of the art are within the concepts and principles of the invention, as defined by the claims and equivalents.

What is claimed is:

1. A method for providing real-time access to a transcript being developed from spoken words, said method comprising the steps of:

recording said spoken words as units of transcribed text;

translating said units of transcribed text into a generally accurate transcript of said spoken words;

converting said transcript of said spoken words into a signal to be transmitted to an authorized receiving unit over a communication link;

transmitting a presentation object to said authorized receiving unit for presenting said transcript; and transmitting said signal and;

identifying said authorized receiving unit as being authorized to receive said transcript, wherein said step of identifying said authorized receiving unit comprises the steps of:

suppressing transmission of an automatically assigned network identifier over said communication link;

manually assigning a network identifier that is to be used to identify a recipient as having authorization to receive said transcript; and comparing an identifier entered by said recipient at a receiving unit with said manually assigned network identifier.

2. A method for providing real-time access to a transcript being developed from spoken words, said method comprising the steps of:

recording said spoken words as units of transcribed text;

translating said units of transcribed text into a generally accurate transcript of said spoken words;

converting said transcript of said spoken words into a signal to be transmitted to an authorized receiving unit over a communication link;

transmitting a presentation object to said authorized receiving unit for presenting said transcript; and transmitting said signal, wherein said step of transmitting said presentation object and said signal comprise transmitting said presentation object and said signal over a wireless communication link comprising the steps of:

diverting said presentation object and said signal from a communication port of a conversion unit to a network port of said conversion unit;

transmitting said presentation object and said signal from said conversion unit through said network port to a wireless access point; and broadcasting said presentation object and said signal from said wireless access point to a dedicated network address.

3. A transcription system for providing real-time access to a transcript being developed from spoken words, said system comprising:

a transcription terminal for recording spoken words as units of transcribed text;

a conversion unit for translating said units of transcribed text into a generally accurate transcript of said spoken words and converting said transcript into a signal;

a security object that prevents an automatically assigned network identifier from being transmitted to a network including at least one authorized receiving unit; and a manually assigned network identifier to be entered at a receiving unit to verify authorization of said receiving unit to receive said transcript of said spoken words.

4. The system according to claim 3, wherein said security object includes computer readable logic for suppressing transmission of said automatically assigned network identifier.

5. The system according to claim 3, wherein said automatically assigned network identifier is a service set identifier.

6. The system according to claim 3 further comprising a presentation object to be transmitted to said authorized receiving unit.

7. The system according to claim 3 further comprising a wireless access point operatively connected to said conversion unit for transmitting said signal to said authorized receiving unit over a wireless communication link.

8. The system according to claim 3, wherein said wireless communication link is a wireless local area network.

9. The system according to claim 8, wherein said wireless access point transmits said signal to a dedicated network address.

10. The system according to claim 3, wherein said manually assigned network identifier is to entered at said authorized receiving unit to join said network.

11. The system according to claim 3, wherein said network is a wide area network.

12. A method for providing real-time access to a transcript being developed from spoken words, said method comprising the steps of:

recording said spoken words as units of transcribed text;

translating said units of transcribed text into a generally accurate transcript of said spoken words;

converting said transcript into a signal;

suppressing transmission of an automatically generated network identifier to a network;

manually assigning a network identifier that is to be entered at a receiving unit to verify authorization of said receiving unit to receive said transcript; and transmitting said signal upon verifying authorization of said receiving unit to receive said transcript.

13. The method according to claim 12 further comprising the step of transmitting a presentation object to said receiving unit upon verifying said authorization of said receiving unit to receive said transcript.

* * * * *